United States Patent

Kohlhaupt

Patent Number: 5,354,876
Date of Patent: Oct. 11, 1994

[54] PREPARATION AND PURIFICATION OF 1-AMINO-2-PHENOXY-4-HYDROXYAN-THRAQUINONE

[75] Inventor: Reinhold Kohlhaupt, Frankenthal, Fed. Rep. of Germany

[73] Assignee: BASF Aktiengesellschaft, Ludwigshafen, Fed. Rep. of Germany

[21] Appl. No.: 94,988

[22] Filed: Jul. 22, 1993

Related U.S. Application Data

[63] Continuation of Ser. No. 859,899, Mar. 30, 1992, abandoned.

[30] Foreign Application Priority Data

Apr. 11, 1991 [DE] Fed. Rep. of Germany ....... 4111827

[51] Int. Cl.$^5$ .......................................... C07C 225/34
[52] U.S. Cl. ................................................ 552/242
[58] Field of Search ........................................ 552/242

[56] References Cited

U.S. PATENT DOCUMENTS 4,278,606  7/1981  Hiller et al. .......... 552/242
4,485,043  7/1984  Kniel .................. 552/242

Primary Examiner—Johann Richter
Assistant Examiner—Rebecca Cook
Attorney, Agent, or Firm—Oblon, Spivak, McClelland, Maier & Neustadt

[57] ABSTRACT

Pure 1-amino-2-phenoxy-4-hydroxyanthraquinone is prepared by reacting 1-amino-2-halo-4-hydroxyanthraquinone with phenol in aqueous suspension at pH 9–13 and 130°–160° C., adjusting the reaction mixture pH to 9.5–11.5 after the reaction has ended, separating the reaction product from the liquid phase, and washing it with alkaline hypochlorite solution.

3 Claims, No Drawings

PREPARATION AND PURIFICATION OF 1-AMINO-2-PHENOXY-4-HYDROXYAN-THRAQUINONE

This is a continuation of application Ser. No. 07/859,899, filed on Mar. 30, 1992 now abandoned.

The present invention relates to an improved process for preparing 1-amino-2-phenoxy-4-hydroxyanthraquinone by reacting a 1-amino-2-halo-4-hydroxyanthraquinone with phenol in aqueous suspension at pH 9–13 and 130°–160° C.

The present invention also relates to an improved process for purifying 1-amino-2-phenoxy-4-hydroxyanthraquinone which has been obtained by reacting a 1-amino-2-halo-4-hydroxyanthraquinone with phenol.

1-Amino-2-phenoxy-4-hydroxyanthraquinone is an important red disperse dye for polyester and is also an important intermediate for preparing further disperse dyes.

It is commonly prepared by reacting a 1-amino-2-halo-4-hydroxyanthraquinone with phenol, either in an organic solvent, including inter alia excess phenol, requiring costly recovery, or in aqueous alkali.

In the latter case, however, existing processes involve the addition of dispersants (Zh. Prikl. Khim. 49, (1976), 904–905; English translation: J. Appl. Chem. USSR 49 (1976), 946–947) and additionally phase transfer catalysts and buffer substances, preferably phosphates (EP-A-16 432), which likewise makes effluent treatment necessary.

A further considerable disadvantage of these methods of preparation is that the product is obtained in the form of spherical or lenticular agglomerates about 0.5 to 1.0 cm in diameter, which are difficult to filter and rid of impurities.

The crude product is commonly purified by recrystallization, especially fractional recrystallization from sulfuric acid, sublimation or stirring in a sodium hypochlorite-sodium carbonate mixture.

The methods of purification mentioned are not only associated with high yield losses, and hence uneconomical, but also leave the dye insufficiently pure, so that dyeings on polyester turn out much duller and bluer than is acceptable today.

It is an object of the present invention to provide a technically simple way of a) preparing 1-amino-2-phenoxy-4-hydroxyanthraquinone in high yield in a form which permits further working-up of the crude product and b) purifying it in such a way that the present-day purity requirements are met without high yield losses.

We have found that this object is achieved by a process for preparing 1-amino-2-phenoxy-4-hydroxyanthraquinone by reacting a 1-amino-2-halo-4-hydroxyanthraquinone with phenol in aqueous suspension at pH 9–13 and 130°–160° C., which comprises, after the reaction has ended, adjusting the reaction mixture pH to 9.5–11.5 and then separating the reaction product from the liquid phase.

We have also found a process for purifying 1-amino-2-phenoxy-4-hydroxyanthraquinone obtained by reacting a 1-amino-2-halo-4-hydroxyanthraquinone with phenol, which comprises washing the crude product with alkaline hypochlorite solution.

The starting compounds for the preparation according to the present invention - 1-amino-2-halo-4-hydroxyanthraquinone, preferably the bromine derivative and particularly preferably the chlorine derivative, and phenol—are in general used in a molar ratio of from 1:1 to 1:6, preferably from 1:2.5 to 1:4.5. The anthraquinone used may be of technical grade, provided it has a purity of at least 93.5% by weight.

The aqueous suspension of the starting compounds is set to an alkaline pH by addition of a base, for example an alkali metal carbonate such as sodium or potassium carbonate or in particular an alkali metal hydroxide such as potassium and especially sodium hydroxide, preferably in the form of an aqueous approximately 50% by weight solution thereof. In the suspension, the weight ratio of the preferred component, 1-amino-2-chloro-4-hydroxyanthraquinone, to sodium hydroxide is in general within the range from 1:0.1 to 1:0.5, preferably within the range from 1:0.2 to 1:0.4, which in general results in a pH of from 9 to 13 for the aqueous mixture. Since base is consumed in the course of the reaction, the pH after the reaction has ended will in general be $9.2 \pm 0.2$.

In general, the reaction is carried out at 130°–160° C., preferably at 140°–150° C. This generally results in an autogenous pressure of from 3 to 6 bar, preferably of from 3.5 to 4.5 bar.

The process is in general carried out by heating the mixture in a pressure-resistant reactor to the desired temperature in the course of about 1–2 h and stirring the mixture at that temperature for about 10–14 h, at which point the reaction will in general have ended (detection by thin layer chromatography).

In the process of preparation according to the present invention, the pH of the reaction mixture will in general be set to 9.5–11.5, preferably 10–11, after the reaction has ended.

For this the reaction mixture is advantageously first cooled down to, in general, 60°–90° C., preferably 70°–80° C. Then a base is added, preferably an alkali metal hydroxide such as potassium or in particular sodium hydroxide, preferably in an approximately 40–60% by weight aqueous solution. The reaction mixture is then generally stirred at that temperature for a further 1–4 h, preferably 2–3 h.

Surprisingly, the crude product obtained according to the present invention does not clump; instead it is obtained in a readily filterable form, so that it can be separated from the aqueous phase by filtration and then further purified by washing with hot water at about 60°–70° C. until the runoff is almost colorless.

The purification according to the present invention can be applied to crude 1-amino-2-phenoxy-4-hydroxyanthraquinone as obtained by reaction of 1-amino-2-halo-4-hydroxyanthraquinone with phenol in aqueous media or in organic solvents.

Specifically, the crude product is washed with an alkaline hypochlorite solution, preferably an alkali metal hypochlorite such as potassium hypochlorite or in particular sodium hypochlorite, having an active chlorine content of in general 1–6% by weight, preferably 2–4% by weight, and a temperature of in general 10°–50° C., preferably 20°–40° C. ("dilute chlorine bleach liquor"). The weight ratio of sodium hypochlorite solution to 1-amino-2- phenoxy-4-hydroxyanthraquinone is in general within the range from 0.5:1 to 3:1, preferably within the range from 1:1 to 2:1.

It is particularly advantageous to wash three times with hypochlorite solution, with a wash in-between each time with hot water at about 60°–70° C. until the runoff is almost colorless and at the end until the product has been washed neutral, making it possible to achieve very high product purities.

A particularly preferred version of the present invention is the preparation of pure 1-amino-2-phenoxy-4-hydroxyanthraquinone by combining the preparation according to the present invention with the purification according to the present invention. This results in 1-amino-2-phenoxy-4-hydroxyanthraquinone in very high yields of 96–99% and extremely high purities of around 98.5% in a technically simple manner.

EXAMPLE 1

A 1 l reactor made of stainless steel is charged with 288 g of water, 40 g of 50% by weight sodium hydroxide solution, 87.5 g (0.93 mol) of phenol and 82.4 g of a 93.5% by weight 1-amino-2-chloro-4-hydroxyanthraquinone (77 g (0.28 mol) calculated on 100% by weight) with stirring. After pressuretight sealing of the reactor the reaction mixture was heated to 150° C. in the course of about 1.5 h, resulting in a pressure buildup to 4–4.5 bar. The reaction mixture was stirred for 12 hours, cooled down to 70° C., and depressurized.

The pH of the reaction mixture, within which 1-amino-2-chloro-4-hydroxyanthraquinone was no longer detectable by thin layer chromatography, was 9.2 and 42 g of 50% by weight sodium hydroxide solution was stirred in to raise it to 11. The suspension was then stirred at 70° C. for a further 2 h. The precipitate was filtered off at 70° C. and then washed with hot water at about 70° C. until the runoff was almost colorless.

Thereafter it was washed three times with 120 g each time of a dilute chlorine bleach liquor having an active chlorine content of 2% by weight and a temperature of 25° C., each bleach Liquor wash being followed by a wash with hot water at about 70° C. until the runoff was almost colorless and at the end until the product had been washed neutral. The product was then dried at 100°–120° C. for 16 h.

This gave 89.0 g of 1-amino-2-phenoxy-4-hydroxyanthraquinone having an HPLC purity of 98.5%, corresponding to a yield of 95.5%.

The disperse dye obtained gave a very clean hue on polyester.

EXAMPLE 2

The reaction product was prepared and purified as described in Example 1. After the reaction had ended, however, the reaction mixture pH was only raised to 10 by addition of 25 g of 50% by weight sodium hydroxide solution.

This gave 91.8 g of 1-amino-2-phenoxy-4-hydroxyanthraquinone having a purity of 98.5%, corresponding to a yield of 98.5%.

The dye obtained likewise gave a very clean hue on polyester.

We claim:

1. A process for purifying 1-amino-2-phenoxy-4-hydroxyanthraquinone obtained by the reaction of a 1-amino-2-halo-4-hydroxyanthraquinone with phenol, which consists essentially of washing the crude product with an alkaline hypochlorite solution which has an active chlorine content of from 1 to 6% by weight.

2. A process as claimed in claim 1, wherein the alkaline hypochlorite solution has an active chlorine content of from 1 to 4% by weight.

3. A process for preparing 1-amino-2-phenoxy-4-hydroxyanthraquinone, comprising:
   (a) heating an aqueous suspension consisting essentially of (i) water, (ii) 1-amino-2-halo-4-hydroxyanthraquinone, (iii) phenol and (iv) sufficient base to afford a pH of 9–13, to a temperature of 130°–160° C., to obtain a reaction mixture containing 1-amino-2-phenoxy-4-hydroxyanthraquinone;
   (b) adjusting the pH of the reaction mixture to 9.5–11.5;
   (c) separating said 1-amino-2-phenoxy-4-hydroxyanthraquinone from said reaction mixture; and
   (d) washing the separated 1-amino-2-phenoxy-4-hydroxyanthraquinone with an alkaline hypochlorite solution which has an active chlorine content of from 1 to 6% by weight, to obtain pure 1-amino-2-phenoxy-4-hydroxyanthraquinone.

* * * * *